United States Patent
Takano et al.

(10) Patent No.: US 11,409,369 B2
(45) Date of Patent: Aug. 9, 2022

(54) WEARABLE USER INTERFACE CONTROL SYSTEM, INFORMATION PROCESSING SYSTEM USING SAME, AND CONTROL PROGRAM

(71) Applicant: Hitachi, Ltd., Tokyo (JP)

(72) Inventors: Masaki Takano, Tokyo (JP); Junichi Kuwata, Tokyo (JP); Sayuri Hashizume, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/282,811

(22) PCT Filed: Oct. 29, 2019

(86) PCT No.: PCT/JP2019/042258
§ 371 (c)(1),
(2) Date: Apr. 5, 2021

(87) PCT Pub. No.: WO2020/166140
PCT Pub. Date: Aug. 20, 2020

(65) Prior Publication Data
US 2021/0389827 A1    Dec. 16, 2021

(30) Foreign Application Priority Data
Feb. 15, 2019   (JP) .............................. JP2019-025281

(51) Int. Cl.
*G06F 3/01*    (2006.01)
*G06V 20/00*    (2022.01)
*G06V 40/20*    (2022.01)

(52) U.S. Cl.
CPC .............. *G06F 3/017* (2013.01); *G06F 3/011* (2013.01); *G06V 20/00* (2022.01); *G06V 40/28* (2022.01)

(58) Field of Classification Search
CPC .......... G06F 3/017; G06F 3/011; G06F 3/014; G06K 9/00355; G06K 9/00624; G06V 20/00; G06V 40/28
See application file for complete search history.

(56) References Cited

U.S. PATENT DOCUMENTS 8,144,238 B2 * 3/2012 Kotake ................ G06V 10/245
382/199
9,972,133 B2 * 5/2018 Coleman .............. G02B 27/017
(Continued)

FOREIGN PATENT DOCUMENTS

JP    2013-003708 A    1/2013
JP    2016-115125 A    6/2016
(Continued)

OTHER PUBLICATIONS

International Search Report with English translation and Written Opinion issued in corresponding application No. PCT/JP2019/042258 dated Jan. 7, 2020.

*Primary Examiner* — Grant Sitta
(74) *Attorney, Agent, or Firm* — Foley & Lardner LLP

(57) ABSTRACT

An input action setting unit selects an action of a user to be accepted as an input operation. An input accepting unit accepts an output from a sensor that is worn by a user and detects a movement of at least one region of the user. When detecting based on the output of the sensor that the user has performed the action selected by the input action setting unit, the input accepting unit accepts the action as an input operation performed by the user. The input action setting unit selects an action of the user to be accepted as the input operation from among preset multiple kinds of action of the user based on at least one of an environment in which the user is placed and a working action of the user other than the input operation, and sets the action in the input accepting unit.

12 Claims, 12 Drawing Sheets

(56) References Cited

U.S. PATENT DOCUMENTS

| | | | |
|---|---|---|---|
| 10,698,535 B2 | 6/2020 | Norieda | |
| 10,885,704 B1 * | 1/2021 | Hill | G06F 3/0304 |
| 2012/0259973 A1 * | 10/2012 | Windell | G06K 9/6201 |
| | | | 709/224 |
| 2014/0168266 A1 * | 6/2014 | Kimura | G06F 3/011 |
| | | | 345/633 |
| 2014/0267019 A1 * | 9/2014 | Kuzmin | G06F 3/017 |
| | | | 345/156 |
| 2015/0123895 A1 * | 5/2015 | Takano | G06F 3/014 |
| | | | 345/156 |
| 2015/0248826 A1 * | 9/2015 | Hahn | G05B 19/409 |
| | | | 340/539.11 |
| 2015/0262425 A1 * | 9/2015 | Hastings | G02B 27/0172 |
| | | | 345/633 |
| 2016/0045971 A1 * | 2/2016 | Holverson | B23K 9/1087 |
| | | | 219/132 |
| 2016/0314623 A1 * | 10/2016 | Coleman | G06T 19/006 |
| 2017/0344124 A1 * | 11/2017 | Douxchamps | G06F 3/0426 |
| 2018/0173544 A1 * | 6/2018 | Hyodo | G06F 3/013 |
| 2018/0267618 A1 * | 9/2018 | Du | H04M 1/72454 |
| 2020/0271450 A1 * | 8/2020 | Gorur Sheshagiri | G06F 1/163 |

FOREIGN PATENT DOCUMENTS

| | | |
|---|---|---|
| JP | 6288372 B2 | 3/2018 |
| JP | 2018-181293 A | 11/2018 |
| WO | WO-2017/002488 A1 | 1/2017 |

* cited by examiner

FIG. 6

INITIAL CONDITIONS
INPUT

1. ARE YOU WEARING A HELMET?

◉ Yes
   ○ No

2. DO YOU WISH THE INPUT METHOD TO BE ADOPTED AS AN INPUT OPERATION TO BE DECIDED AUTOMATICALLY OR MANUALLY?

◉ AUTOMATICALLY
   ○ MANUALLY

3. IF YOU CHOSE "AUTOMATICALLY" IN 2 ABOVE, PLEASE SELECT A TRIAL PERIOD.

○ ONE DAY
   ◉ ONE WEEK

FIG. 7

WORK INSTRUCTIONS

PROCESS 1: THE WORK CONTENTS
ARE AS FOLLOWS:
INSERT SCREW A INTO SCREW HOLE B, AND
FIX BY ROTATING WITH SCREWDRIVER C.

WITH SCREW D...

PLEASE START THE WORK

FIG. 10

THE FOLLOWING ACTION HAS BEEN SET
AS THE INPUT METHOD

TAPPING ACTION

PLEASE CONTINUE THE WORK

FIG. 11

PLEASE SELECT AN INPUT METHOD

- ⦿ TWISTING
- ○ TAPPING
- ○ HAND RAISING
- ○ MANUAL
- ○ CONSENTING
- ○ ...

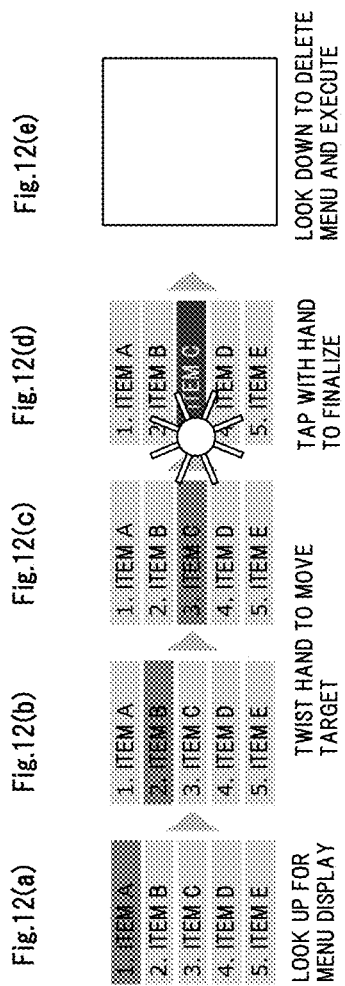

WEARABLE USER INTERFACE CONTROL SYSTEM, INFORMATION PROCESSING SYSTEM USING SAME, AND CONTROL PROGRAM

TECHNICAL FIELD

The present invention relates to a system wherein an input of information is accepted from a user who carries out an operation wearing a wearable device on his or her body, the information is processed, and output information is displayed or the like for the user.

BACKGROUND ART

In recent years, technology whereby an image showing an operating switch is superimposed on an actual scene using augmented reality (AR) technology and displayed to an operator wearing a spectacle-type or a wristwatch-type wearable device called smart glasses, a smartwatch, or the like on his or her body, an operation of the switch in the image is enabled, and an operation is started by a predetermined user performing a gesture with a finger, has been proposed in, for example, Patent Literature 1 and 2 and the like.

Specifically, technology whereby a keyboard image prepared in advance is caused to be displayed superimposedly on a smart glasses display screen, and a keyboard is determined to have been operated by a user performing a movement of operating the keyboard image with his or her own finger on the display screen, is disclosed in Patent Literature 1. In this case, the technology of Patent Literature 1 is such that in order that a position on the display screen of a head-mounted display in which the keyboard image is displayed superimposedly is a position easily operated by the user, the position in which the keyboard image is displayed superimposedly is determined by adopting a position of an image displayed on the display screen of a device attached to an arm of the user as a marker (reference).

A wearable search system wherein a target object image search is started by a user wearing smart glasses on his or her eyes and wearing an action sensor on his or her arm performing a predetermined gesture with a finger while looking at a target object is disclosed in Patent Literature 2.

CITATION LIST

Patent Literature

Patent Literature 1: Japanese Patent No. 6,288,372
Patent Literature 2: JP-A-2016-115125

SUMMARY OF INVENTION

Technical Problem

Technology proposed to date is such that an input action when operating a system is an action fixed in advance in accordance with the system, such as an action of operating a keyboard image displayed superimposedly on a smart glasses display screen with a finger (Patent Literature 1), or a predetermined gesture with a user's finger (Patent Literature 2).

An advantage of a system in which a wearable device is used is that there is no need for a user to hold a system device such as a terminal, and the system is desirably such that a user inputs information by operating the system while performing desired work or an action using both hands, and obtains an output of necessary information from a system display screen or the like. However, there is often a restriction such as both hands of a user being occupied with a tool for working, or a work space being cramped, and there are cases in which it is difficult for a user to operate a keyboard image with a finger or perform a predetermined gesture.

An object of the invention is to provide a wearable device control system such that an appropriate input action can easily be set from among a multiple of input actions.

Solution to Problem

In order to achieve the heretofore described object, a wearable user interface control system of the invention has an input action setting unit that selects an action of a user to be accepted as an input operation, and an input accepting unit that accepts an output of a sensor worn by a user and detecting a movement of at least one region of the user, and when detecting based on the output of the sensor that the user has performed the action selected by the input action setting unit, accepts the action as an input operation performed by the user. The input action setting unit selects an action of the user to be accepted as the input operation from among preset multiple kinds of action of the user based on at least one of an environment in which the user is placed and a working action of the user other than the input operation, and sets the action in the input accepting unit.

Advantageous Effects of Invention

By using the user interface control system of the invention, an appropriate input action can be selected from among multiple kinds of input action in accordance with an environment in which a user is placed or work contents.

BRIEF DESCRIPTION OF DRAWINGS

FIG. 6 is an example of a screen displayed by the wearable UI control system 101 of the embodiment.

FIG. 7 is an example of a screen displayed by the wearable UI control system 101 of the embodiment.

FIG. 10 is an example of a screen displayed by the wearable UI control system 101 of the embodiment.

FIG. 11 is an example of a screen displayed by the wearable UI control system 101 of the embodiment.

FIGS. 12(a) to (e) are a menu screen displayed by the wearable UI control system 101 of the embodiment and an example of screens showing a process of selecting an item using a combination of multiple input methods.

DESCRIPTION OF EMBODIMENTS

Hereafter, a description will be given of an information processing system in which a wearable user interface control system according to an embodiment of the invention is used.

Information Processing System Overall Configuration

Figure 1:
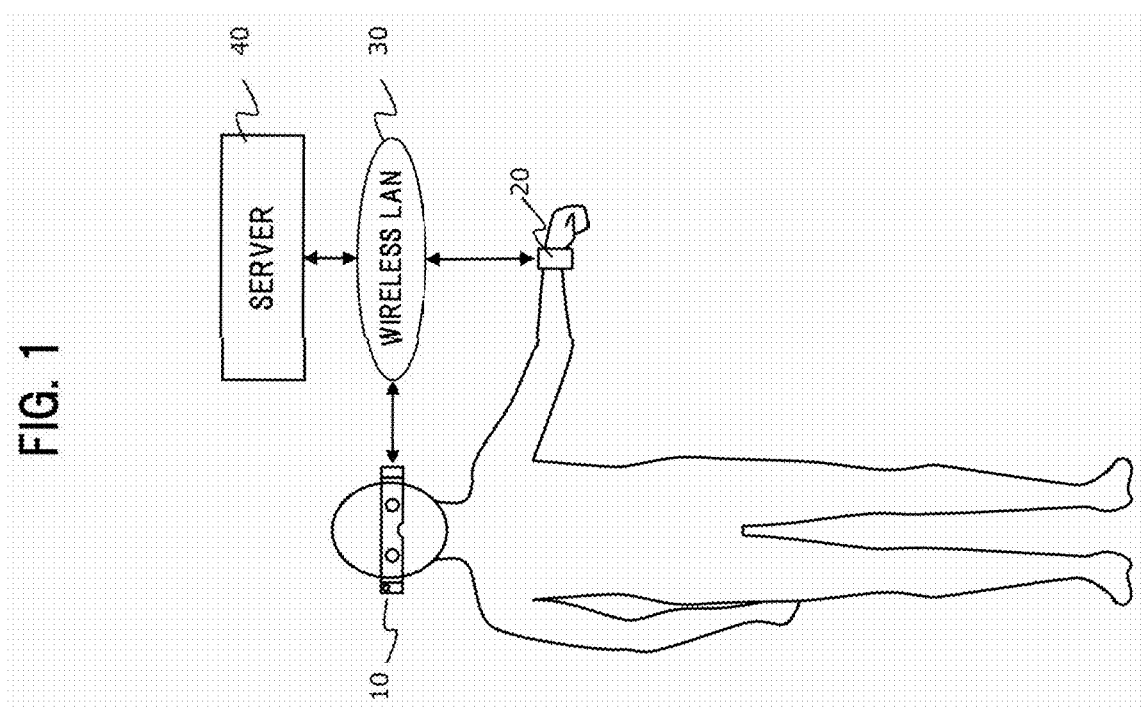
FIG. 1 is an illustration showing an overall configuration of an information processing system in which a wearable user interface control system of an embodiment is used.
Figure 2:
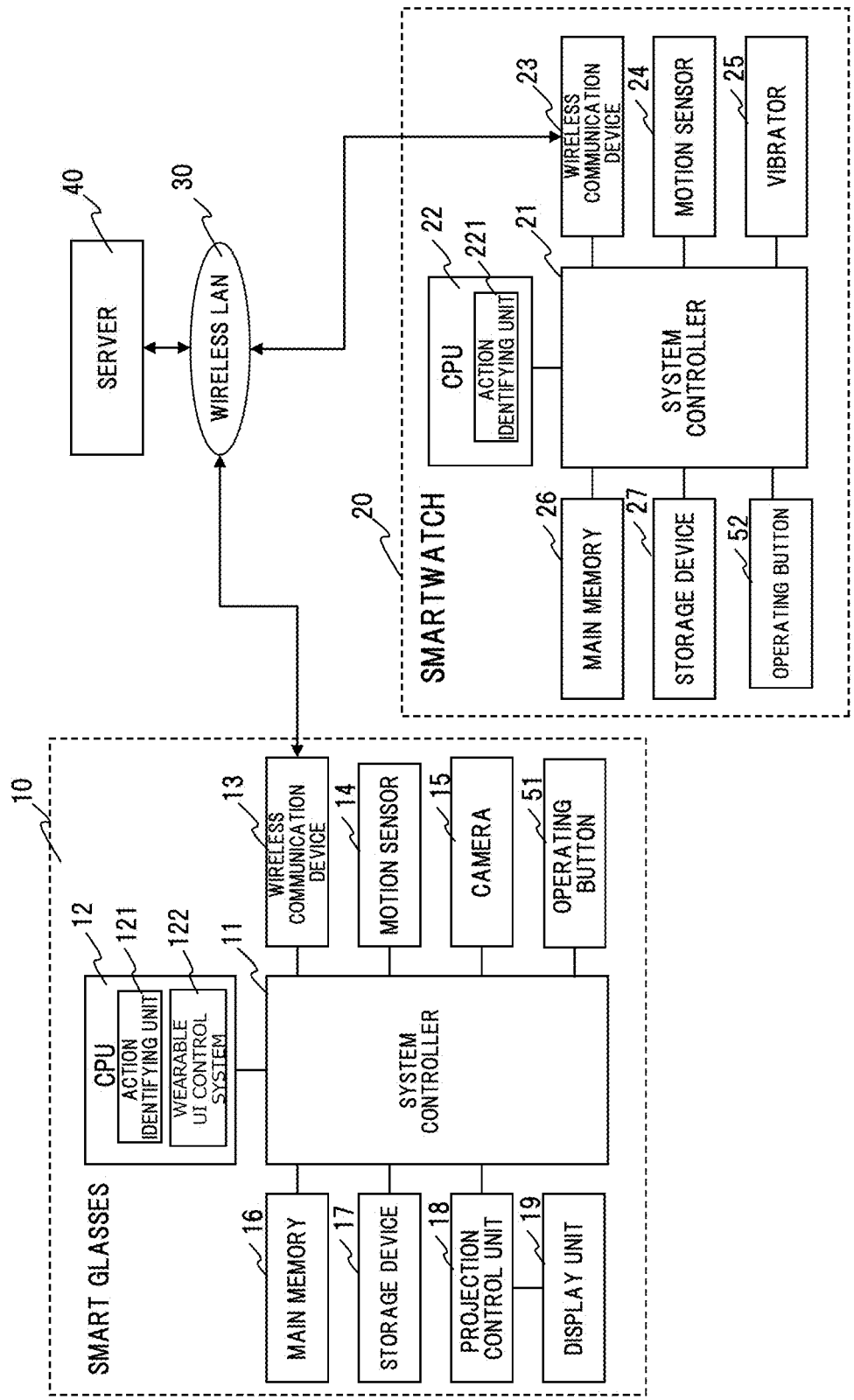
FIG. 2 is a block diagram showing a detailed configuration of each portion of the information processing system of FIG. 1.

FIG. 1 shows an overall configuration of the information processing system of the embodiment, and FIG. 2 shows a configuration of each portion of the information processing system.

As shown in FIG. 1 and FIG. 2, the information processing system of the embodiment includes a wearable terminal (smart glasses as an example) 10, a wearable sensor (a motion sensor-equipped smartwatch as an example) 20, a server 40, and a network (a wireless LAN (local area network) as an example) 30. The smart glasses 10 are worn as spectacles by a user (operator). The smartwatch 20 is worn on an arm of the user. The smart glasses 10 and the smartwatch 20 are connected to the server 40 via the wireless LAN 30.

The smart glasses 10 and the smartwatch 20 configure a user interface (UI) that accepts an input operation by the user, and outputs (displays or the like) a computation process result for the user. A function of the smart glasses 10 and the smartwatch 20 accepting an input operation from the user is controlled by a wearable UI control system 101. In the embodiment, the wearable UI control system 101 controls in such a way that the smart glasses 10 and the smartwatch 20 can receive input operations input using multiple kinds of input method, and moreover, selects and sets an input method in order that an input operation can be carried out using an appropriate input method in accordance with an environment in which the user is placed or a working action.

In the embodiment, an example of a configuration wherein the wearable UI control system 101 is disposed inside a CPU 12 inside the smart glasses 10 will be described. Note that the wearable UI control system 101 can also be disposed in the smartwatch 20 or the server 40.

An input operation accepted from the user by the smart glasses 10 and the smartwatch 20 under the control of the wearable UI control system 101 is transferred to the server 40 via the wireless LAN 30, and a predetermined computation process is executed in the server 40. A result of the computation process is output to the user via the wireless LAN 30 using a display function of the smart glasses 10 or a vibration function of the smartwatch 20.

Smart Glasses 10

As shown in FIG. 2, the smart glasses 10 are configured to include spectacles, and a motion sensor 14, a camera 15, a display unit 19, a projection control unit 18, a wireless communication device 13, a system controller 11, the CPU 12, a main memory 16, a storage device 17, and an operating button 51 mounted in one portion of the spectacles.

The motion sensor 14 detects a vertical and horizontal movement and rotation of a head portion of a user wearing the spectacles by detecting a movement speed or acceleration.

The camera 15 takes an image in a predetermined direction, such as a direction of a user sight line.

The CPU 12 executes various computations by executing a program stored in advance in the main memory 16 or the storage device 17. By so doing, the CPU 12 realizes functions of each of an action identifying unit 121 and the wearable UI control system 101.

Figure 3:
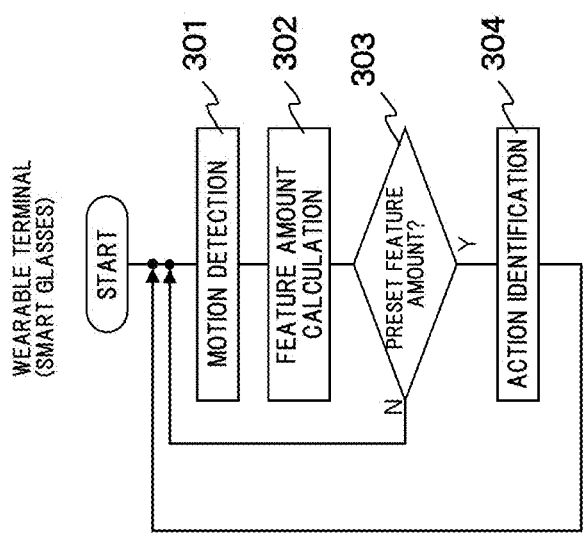
FIG. 3 is a flowchart showing an action of an action identifying unit 121 of the embodiment.

The action identifying unit 121 detects a predetermined action of the user, such as whether the user has nodded, looked up or down, or shaken his or her head left and right, by processing an output of the motion sensor 14. Specifically, as shown in FIG. 3, the action identifying unit 121 accepts a value (a movement direction, a movement speed, a movement amount, a rotation direction, a rotation speed, a rotation amount, or the like) detected by the motion sensor 14 (step 301), and calculates a feature amount by substituting the value into a preset numerical expression (step 302). The action identifying unit 121 determines whether the calculated feature amount is included in a range of a feature amount of each of one or more preset actions (for example, a nodding action, an action of looking up, an action of looking down, an action of turning the head left or right, or an action of shaking the head left and right) (step 303), and when the calculated feature amount is included in the range of the feature amount of any action, the action identifying unit 121 determines that the user has performed that action (step 304).

A function of the wearable UI control system 101 will be described in detail hereafter.

Also, by accepting and processing a value detected by the motion sensor 14 and an image taken by the camera 15, the CPU 12 can calculate a distance between a wall in a periphery of a user appearing in the image and the camera. For example, by contrasting a movement amount of a head (the smart glasses 10) and the magnitude of a change in the image from the camera 15, the CPU 12 can determine, using publicly known technology, whether or not a distance between the head (the smart glasses) and a wall imaged by the camera is a short distance within a preset distance (for example, 1 m). Also, by processing an image taken by the camera 15, the CPU 12 can detect whether or not a user is holding a tool in either hand (for example, that of the arm on which the smartwatch 20 is being worn).

An image taken by the camera 15 and a result of a computation by the CPU 12 are stored as necessary in the main memory 16 and the storage device 17. Also, an image to be displayed in the display unit 19 can also be stored in the main memory 16 and the storage device 17.

The display unit 19 is disposed in one portion of a spectacle lens, and projects a predetermined image within a field of vision of a user under a control of the projection control unit 18. Because of this, an image projected by the display unit 19 can be displayed superimposedly on an actual scene visually recognized by a user through the spectacle lens. Because of this, a result of a computation process by the server 40, such as information to be reported to the user or a description of a process to be worked on next by the user, can be displayed in the display unit 19.

A display unit of a structure such that an image is projected onto a retina of a user can also be used as the display unit 19.

The wireless communication device 13 carries out communication between the system controller 11 and the server 40 or the smartwatch 20.

The system controller 11 carries out a control of actions of the motion sensor 14, the camera 15, the display unit 19, the projection control unit 18, the wireless communication device 13, the system controller 11, the CPU 12, the main memory 16, and the storage device 17.

The operating button 51 is a button provided on a wristwatch in order to accept an operation by a user.

Smartwatch 20

As shown in FIG. 2, the smartwatch 20 is configured to include a wristwatch, and a motion sensor 24, a vibrator 25, a wireless communication device 23, a system controller 21, a CPU 22, a main memory 26, a storage device 27, and an operating button 52 mounted in one portion of the wristwatch.

The motion sensor 24 detects a vertical and horizontal movement and rotation of an arm of a user wearing the wristwatch by detecting a movement speed or acceleration.

The CPU 22 carries out various computations by executing a program stored in advance in the main memory 26 or the storage device 27. For example, the CPU 22 realizes a function of an action identifying unit 221 that detects a predetermined action of the user using the arm on which the user wears the smartwatch 20, such as hitting, twisting, or raising a hand, by processing an output of the motion sensor 24. Specifically, in the same way as in FIG. 3, the CPU 22 accepts a value (a movement direction, a movement speed, a movement amount, a rotation direction, a rotation speed, a rotation amount, or the like) detected by the motion sensor 24 (step 301), calculates a feature amount by substituting the value into a preset numerical expression (step 302), and determines whether the calculated feature amount is included in a range of a feature amount of each of one or more preset actions (for example, an action of hitting using an arm, an action of twisting an arm, or an action of raising a hand) (step 303), and when the calculated feature amount is included in the range of any feature amount, the CPU 22 determines that the user has performed that action (step 304). By so doing, the CPU 22 can realize the function of the action identifying unit 221.

A result of a computation by the CPU 22 is stored as necessary in the main memory 26 and the storage device 27.

The vibrator 25 conveys information to a user by vibrating. The vibrator 25 can also convey multiple kinds of information to a user by causing a length of vibration time or a vibration frequency to differ, by vibrating intermittently, or by changing a length of a time interval. A preset relationship of kind of vibration of the vibrator 25, and information to be conveyed, may be stored in advance in the main memory 26 and the storage device 27.

The wireless communication device 23 carries out communication between the system controller 21 and the server 40 or the smart glasses 10.

The operating button 52 is a button provided on a wristwatch in order to accept an operation by a user.

Server 40

The server 40 accepts an input from the system controllers 11 and 21 of the smart glasses 10 and the smartwatch 20 via the wireless LAN 30, performs a computation process, and outputs a computation result (for example, data showing details of a process to be worked on next) to the smart glasses 10 or the smartwatch 20. The system controller 11 of the smart glasses 10 notifies a user of the accepted data by causing the accepted details to be displayed in the display unit 19, or the like. The system controller 21 of the smartwatch 20 notifies a user of the accepted data by causing the vibrator 25 to vibrate.

Wearable UI Control System 101

Figure 4:
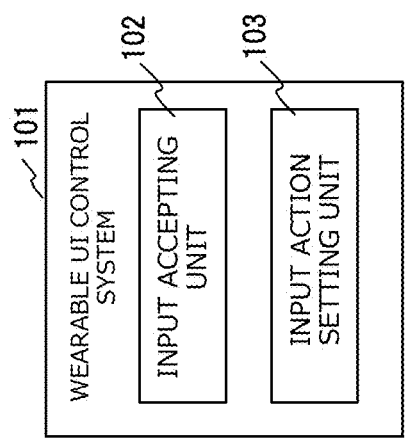
FIG. 4 is a block diagram showing a configuration of a wearable UI control system 101 of the embodiment.

A description will be given of a function of the wearable UI control system 101 realized by the CPU 12 of the smart glasses 10. As shown in FIG. 4, the wearable UI control system 101 includes an input accepting unit 102 and an input action setting unit 103.

The input action setting unit 103 selects an action of a user to be accepted as an input operation, and sets the action in the input accepting unit 102. When doing so, the input action setting unit 103 determines which user action is to be an input operation based on at least one of an environment in which the user is placed and a working action of the user other than the input operation, and selects the user action. When an action detected by the action identifying unit 121 or 221 is an action set by the input action setting unit 103, the input accepting unit 102 accepts the action as an input operation from a user.

Because of this, the input action setting unit 103 can set an action easily performed by a user as an input operation in accordance with an environment in which the user is placed, such as whether or not a tool is being held in a hand of the user, or whether or not the distance from the user to a wall is a predetermined distance or greater.

The input action setting unit 103 can also detect at least one of an action of a hand or a neck of a user as a working action of the user, and select and set an action differing from the detected working action as an input action. For example, the input action setting unit 103 can obtain an input action corresponding to a detected working action based on a preset correspondence relationship between a working action and an input operation to be selected, and set the input action as an input operation.

In this way, according to the wearable UI control system 101 of the embodiment, an action that is an action easily performed by a user, and such that confusion with work contents is unlikely to occur, can be set as an input method (input action) in accordance with an environment in which the user is placed or contents of work (an action) being carried out. It is sufficient that detection of an environment or work contents is carried out in a predetermined period (for example, a preset trial period), which is a period during which the user is carrying out an actual working action, and when the user issues an instruction to end the period for detection, an action to be used as an input action is finalized and set in accordance with detection results thus far.

Hereafter, a specific description will be given of an operation of the information processing system of the embodiment, including an operation of the wearable UI control system 101, using a flow of FIG. 5. Herein, a case wherein the server 40 of the information processing system displays details of a process to be worked on for a user, and displays work contents of the next process when the user has input a completion of work on a certain process, will be described as an example. An example wherein a function of the wearable UI control system 101 is realized using software by the CPU 12 reading and executing a program stored in advance in the main memory will be described here. Note that the wearable UI control system 101 is not limited to a case of being realized using software, and one portion or a whole thereof can also be realized using hardware. For example, it is sufficient that a system controller (the control unit 20) is configured using a custom IC such as an ASIC (application-specific integrated circuit) or a programmable IC such as an FPGA (field-programmable gate array), and that circuit design is carried out in such a way as to realize a function of the system controller.

Step 401

Firstly, the wearable UI control system 101 causes a kind of UI screen shown in FIG. 6 to be displayed in the display unit 19 via the system controller 11 in order to accept an input of initial conditions from a user (operator). On the UI screen, the wearable UI control system 101 accepts information regarding whether or not the user is wearing a helmet, and whether an input method to be used as an input operation is to be decided automatically or decided manually, via an operation of the operating button 51 of the smart glasses 10, or by accepting an operation of the operating button 52 of the smartwatch via the wireless LAN 30. When the user selects that an input operation is to be decided on automatically, the wearable UI control system 101 accepts, in the same way, a length of a trial period, which is a period in which the input method is to be finalized. When the wearable UI control system 101 accepts an input of initial conditions, the wearable UI control system 101 notifies the server 40 of the matter.

Steps 402 and 403

The server 40 transfers, for example, the kind of image data shown in FIG. 7, which give instructions on work contents of a preset process 1 and a work start, to the smart glasses 10, and causes the image data to be displayed in the display unit 19. A user who sees the display starts the work.

Steps 404 and 405

In step 404, the wearable UI control system 101 confirms the initial input accepted in step 401, proceeds to step 405 when the user has selected that which input method is to be an input operation is to be decided automatically, and determines whether or not a current point in time is within the trial period set in the initial input. When the current point in time is within the trial period, the wearable IU control system 101 proceeds to step 411.

Step 411

While the user is carrying out the work of process 1 displayed in step 403, the wearable UI control system 101 carries out a detection of an environment in which the user is placed. Herein, as one example, the CPU 12 detects whether or not the user is holding a tool in the hand of the arm on which the smartwatch 20 is worn by importing an image taken by the camera 15, and carrying out an image processing.

Step 412

Next, the wearable UI control system 101 carries out a detection of a working action while the user is working. Specifically, the wearable UI control system. 101 instructs the action identifying unit 221 of the smartwatch 20 to identify an action while the user is working, and accepts an identification result, thereby measuring an amount (time) of hitting work performed by the hand of the arm on which the smartwatch 20 is worn and an amount (time) of twisting work performed by the hand of the arm on which the smartwatch 20 is worn.

Step 413

The wearable UI control system 101 continues the environment detection and the working action detection of steps 411 and 412 until the user issues an instruction to end the working action for selecting an input method by operating the operating button 51 or 52. When the user issues an instruction to the effect that the working action for selecting an input method is ended, the wearable IU control system 101 proceeds to step 414.

Step 414

Figure 8:
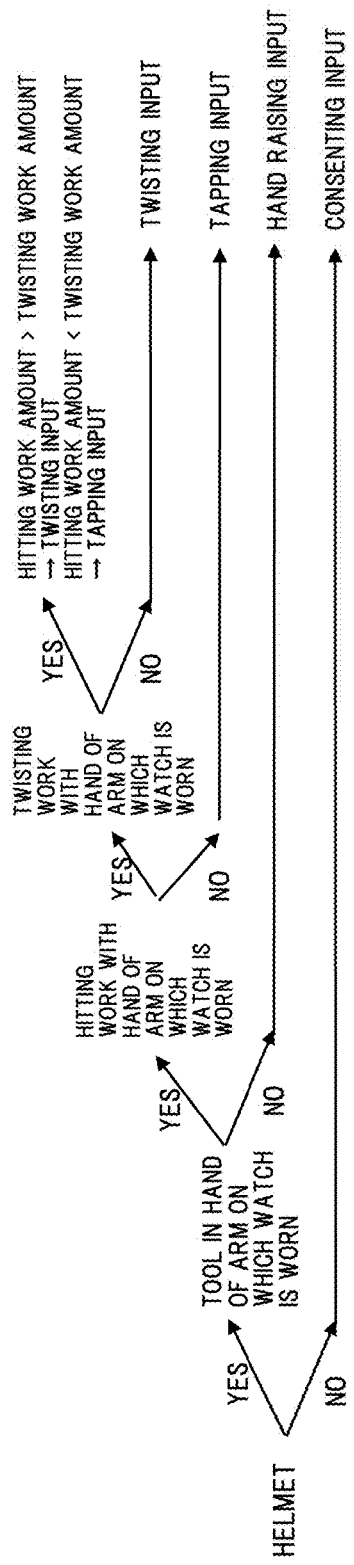
FIG. 8 is an illustration showing a correspondence relationship between initial conditions, a detected environment, and a detected working action and an input method to be selected in the wearable user interface control system of the embodiment.

The wearable UI control system 101 selects and sets an input method in accordance with the initial conditions accepted in step 401 and the environment and working action detected in steps 411 and 412. Specifically, as shown in FIG. 8, the wearable UI control system 101 selects an input method based on a correspondence relationship between the conditions for which an input has been accepted, and the detected environment and working action, and an input method to be selected.

Figure 9:
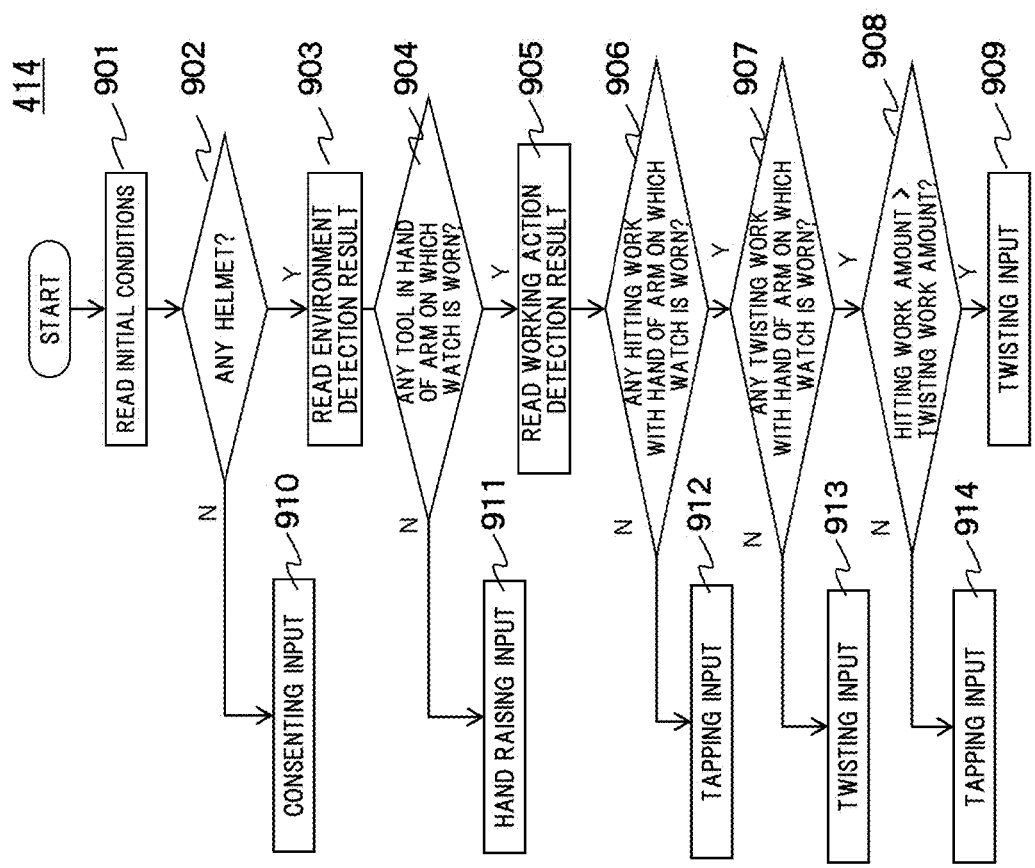
FIG. 9 is a flowchart showing an action of the wearable user interface control system of the embodiment.

An input method selection procedure will be described specifically using a process flow of FIG. 9. The wearable UI control system 101 reads the initial conditions accepted in step 401 from the main memory 16 (step 901), determines whether or not the user is wearing a helmet (step 902), proceeds to step 910 when there is no helmet, and selects a head nodding action (consent) as an input method (input action).

When it is determined that there is a helmet in step 902, the wearable UI control system 101 proceeds to step 903, reads the environment detected in step 411, and determines whether or not a tool is being held in the hand of the arm on which the smartwatch 20 is worn (step 904). When no tool is being held, the wearable UI control system 101 proceeds to step 911, and selects a hand raising action of raising the hand of the arm on which the smartwatch 20 is worn as an input action.

When it is determined that a tool is being held in step 904, the wearable UI control system 101 proceeds to step 905, reads the working action detected in step 412, and determines whether or not hitting work is being carried out with the hand of the arm on which the smartwatch 20 is worn (step 906). When no hitting work is being carried out, the wearable UI control system 101 proceeds to step 912, and selects an action of tapping (hitting lightly) with the hand of the arm on which the smartwatch 20 is worn as an input action.

When it is determined that hitting work is being carried out with the hand of the arm on which the smartwatch 20 is worn in step 906, the wearable UI control system 101 proceeds to step 907, and determines whether or not the working operation detected in step 412 is such that twisting work is being carried out with the hand of the arm on which the smartwatch 20 is worn (step 907). When no twisting work is being carried out, the wearable UI control system 101 proceeds to step 913, and selects an action of twisting with the hand of the arm on which the smartwatch 20 is worn as an input action.

When it is determined that twisting work is being carried out with the hand of the arm on which the smartwatch 20 is worn in step 907, both hitting work and twisting work are being carried out, because of which the wearable UI control system 101 proceeds to step 908, compares the amount of work of a hitting action and the amount of work of a twisting action of the working action detected in step 412, and determines whether or not the amount of hitting work is greater than the amount of twisting work. When the amount of hitting work is less than the amount of twisting work, the wearable UI control system 101 proceeds to step 914, and selects an action of tapping with the hand of the arm on which the smartwatch 20 is worn as an input action. When the amount of hitting work is greater than the amount of twisting work, the wearable UI control system 101 proceeds to step 909, and selects an action of twisting with the hand of the arm on which the smartwatch 20 is worn as an input action.

As heretofore described, the wearable UI control system 101 can select an appropriate input action in accordance with initial conditions, an environment in which a user is placed in a certain process, and work contents of the process. The wearable UI control system 101 saves the selected input action in the main memory 16 or the like as an input action of the user in the relevant process. The wearable UI control system 101 notifies the user of the set input action by displaying the kind of display shown in FIG. 10 in the display unit 19, or the like. Also, the wearable UI control system 101 notifies the server 40 of a completion of input action selection and setting.

The operations of steps 401, 404, 405, and 411 to 414 are operations of the input action setting unit 103 of the wearable UI control system 101.

Steps 407 and 408

The wearable UI control system 101 instructs the user to continue working on the current process using the kind of display shown in FIG. 10, or the like (step 407), and waits until the action identifying unit 121 or 221 accepts the input action set in step 414. When the action identifying unit 121 or 221 accepts the input action set in step 414, the wearable UI control system 101 determines that the user has input a completion of work, and notifies the server 40 (step 408).

The operations of steps 407 and 408 are operations of the input accepting unit 102 of the wearable UI control system 101.

Steps 409 and 410

The server 40 determines whether or not all work processes have ended, returns to step 403 when there is a process that is to continue, and issues instructions on work contents of the next process and a work start.

Step 406

When it is determined that the trial period has ended in step 405, the input action setting unit 103 of the wearable UI control system 101 proceeds to step 406, and sets the input action selected in step 414 in the input accepting unit 102 as an input operation to be accepted. The wearable UI control system 101 proceeds to step 407.

Because of this, the input action setting unit 103 of the wearable UI control system 101 can set an input method appropriate to the user in the relevant process, without executing steps 411 to 414 as is done during a trial period.

Step 415

Also, when the user selects "manual" as an input method in step 404, the wearable UI control system 101 proceeds to step 415, displays the kind of selection screen shown in FIG. 11 to the user, or the like, and accepts an input action selection by the user operating the operating button 51 or 52, or the like. An input action that can be selected by the user is an action that can be identified by the action identifying unit 121 or 221. Herein, the action identifying unit 121 can identify a nodding action, an action of looking up, an action of looking down, an action of turning the head left or right, an action of shaking the head left and right, and the like, and the action identifying unit 221 can identify an action of hitting using an arm, an action of twisting an arm, an action of raising a hand, and the like, because of which the user selects one of these as an input action.

The input action setting unit 103 of the wearable UI control system 101 sets an input action accepted from the user as an input operation to be accepted in the input accepting unit 102, and subsequently proceeds to step 407.

As heretofore described, the information processing system according to the embodiment includes the wearable UI control system 101, an operation can be carried out using multiple kinds of input method (input action), and a setting such that an appropriate input method among the input methods is allotted to a specific input operation based on an environment or a working action of a user can be carried out easily. Because of this, an appropriate input action that is easily performed can be set, even in a case of an environment or work contents having a large number of restrictions, such as both hands of a user being occupied or a helmet being worn. Therefore, an information processing system such that erroneous operations by a user are reduced, whereby work can be carried out efficiently, can be provided.

A number of nods or a number of taps in a consenting input or a tapping input not being limited to one, an arrangement can of course be such that an input of multiple actions, such as two nods or a double tap, can be accepted.

Also, although an example wherein a consenting input is selected as an input action when no helmet is being worn has been described in the embodiment, a configuration wherein a neck action other than consenting, or a hand action, is selected can of course be adopted. Also, when a neck action is adopted as an input action in a case in which a work process is a process wherein a taking with the camera 15 of the smart glasses 10 is carried out, an effect such that an image is blurred occurs, because of which selecting a hand action is desirable.

Input Method Combination

Figure 5:
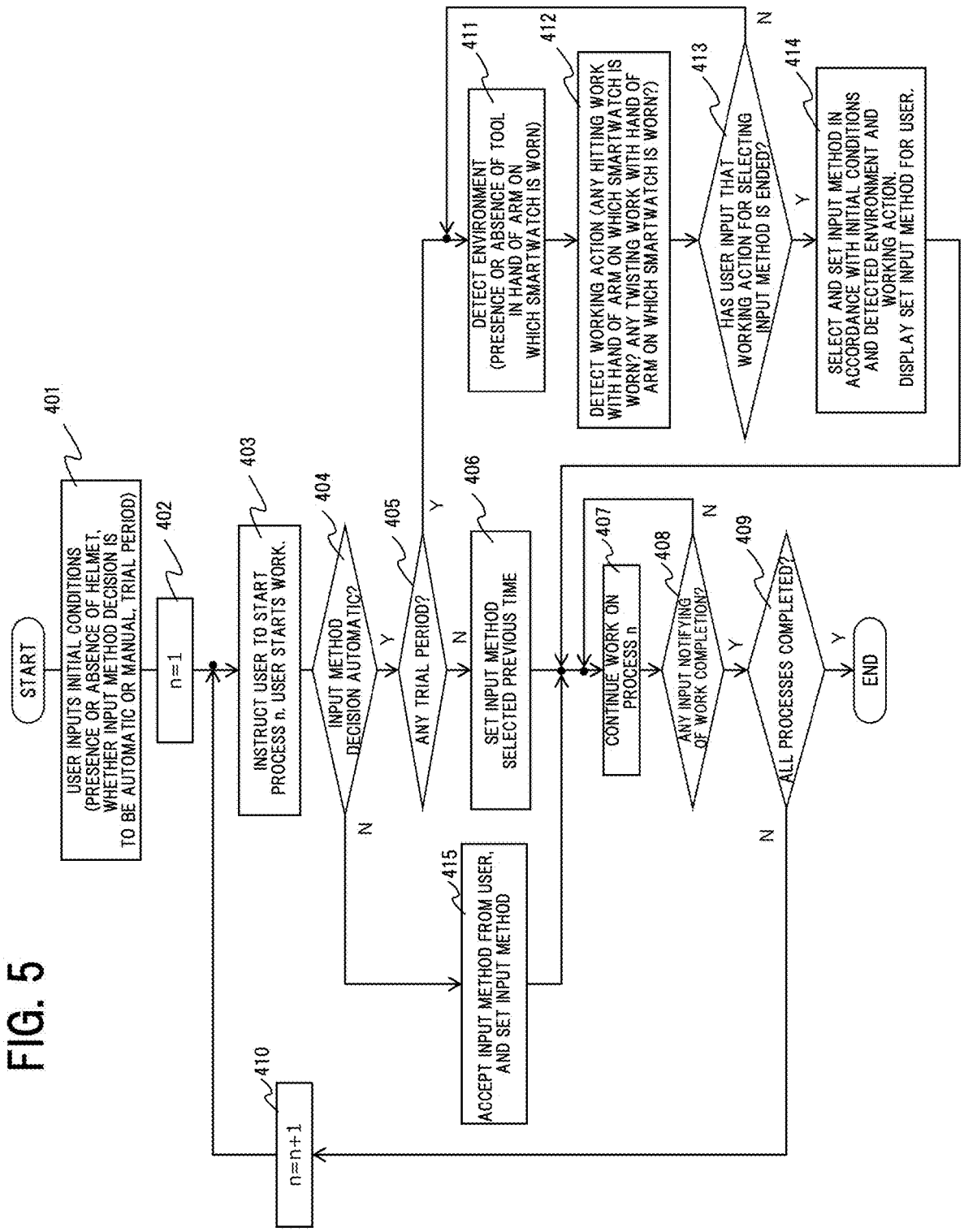
FIG. 5 is a flowchart showing an action of the information processing system of the embodiment.

Although an example wherein one input method (input action) set by the wearable UI control system 101 is used as a work completion input action is described in the flow of FIG. 5, a configuration wherein an input other than a work completion is carried out by combining with another input action or a menu screen display can also be adopted.

For example, an action of looking up and standing still is allotted in advance to "Display menu screen", an action of looking down is allotted to "Cancel menu screen", an action of twisting an arm on which a smartwatch is worn is allotted to "Move target (selection position) on menu screen", and an input operation selected in the embodiment (herein, an action of tapping with an arm on which a smartwatch is worn) is allotted to "Completion (or Finalize)".

Further, when the action identifying unit 121 determines that the user has looked up and stood still, the wearable UI control system 101 retrieves a preset menu screen from the main memory 16 or the like, and causes the menu screen to be displayed in the display unit 19, as in FIG. 12 (*a*). Five items A to E are displayed aligned on the menu screen of FIG. 12 (*a*).

When the action identifying unit 221 determines that the user has performed an action of twisting the arm on which the smartwatch 20 is worn, the wearable UI control system 101 causes the target (selection position) on the menu screen to move, as in FIG. 12(*b*). When the user has repeatedly performed the arm twisting action until the target moves to a position of an item (for example, item C) the user wishes to select (FIG. 12(*c*)), the user taps his or her arm in order to finalize an input of this item. When the action identifying unit 221 determines that a tapping action has been carried out, the wearable UI control system 101 finalizes an input of the currently selected item C (a completion input), as in FIG. 12(*d*).

Further, when the action identifying unit 121 determines that the user has looked down and stood still, the wearable UI control system 101 deletes the menu screen, as in FIG. 12(*e*), and notifies the server 40 of item C, which has been finalized by an input, and the server 40 executes item C.

By combining with another input action or a menu screen display in this way, another input method, such as a menu screen item selection, can be realized.

When an input action set in step 414 is used as a completion input in the flow of FIG. 5, an action differing from the input action set in step 414 is desirably allotted to an action other than a completion input.

In the embodiment, as heretofore described, an information processing system including the wearable UI control system. 101, which can be easily operated by an operator in accordance with a working environment and work contents, can be provided.

Although the smart glasses 10 are used as a wearable terminal in the embodiment, a combination of a helmet or a headband, in which a motion sensor and a camera are included, and a display disposed near a user or a portable display may be adopted. The smartwatch 20 is used as a wearable sensor in the embodiment, but as a watch function is not essential, a belt-equipped motion sensor worn on an arm may also be adopted.

Also, the wearable UI control system 101 is disposed in the CPU 12 inside the smart glasses 10 in the embodiment, but the wearable UI control system 101 may also be disposed in the smartwatch 20 or the server 40. Also, the action identifying units 121 and 221 can also be disposed in the server 40.

REFERENCE SIGNS LIST 10 wearable terminal (smart glasses), 11 system controller, 12 CPU, 13 wireless communication device, 14 motion sensor, 15 camera, 16 main memory, 17 storage device, 18 projection control unit, 19 display unit, 20 wearable sensor (smartwatch), 21 system controller, 22 CPU, 23 wireless communication device, 24 motion sensor, 25 vibrator, 26 main memory, 27 storage device, 30 network (wireless LAN), 40 server, 51, 52 operating button, 101 wearable UI control system, 121 action identifying unit, 221 action identifying unit

The invention claimed is:

1. A wearable user interface control system comprising a processor configured to:
   select an action of a user to be accepted as an input operation; and
   accept an output of a sensor worn by a user and detect a movement of at least one region of the user, and when detecting based on the output of the sensor that the user has performed the selected action, accept the action as an input operation performed by the user, wherein
   the processor selects an action of the user to be accepted as the input operation from among preset multiple kinds of action of the user based on at least one of an environment in which the user is placed and a working action of the user other than the input operation, and sets the action,
   the output of the sensor is a value corresponding to the movement of the at least one region of the user, and
   the processor is further configured to
      calculate a feature amount by substituting the value into a preset numerical expression, and
      determine whether the calculated feature amount is included in a range of a feature amount of each of the preset multiple kinds of action.

2. The wearable user interface control system according to claim 1, wherein the processor detects, when a preset trial period is in progress, at least one of an environment in which the user is placed and a working action of the user other than the input operation, and select an action of the user to be accepted as the input operation based on a detection result.

3. The wearable user interface control system according to claim 2, wherein the processor is further configured to detect at least one of whether or not a tool is being held in a hand of the user and whether or not a distance from the user to a wall is a predetermined distance or greater as the environment in which the user is placed.

4. The wearable user interface control system according to claim 2, wherein the processor is further configured to detect at least one of an action of a hand or a neck of the user as the working action of the user.

5. The wearable user interface control system according to claim 2, wherein the processor selects an action among preset multiple kinds of user action that differs from the action detected as the working action as an action to be accepted as the input operation.

6. The wearable user interface control system according to claim 5, wherein the processor is further configured to obtain, based on a preset correspondence relationship between a working action and an action to be selected, the action to be selected that corresponds to the detected working action, and set the action as an action to be accepted as the input operation.

7. The wearable user interface control system according to claim 1, wherein, when the sensor is worn on an arm of the user, the processor detects at least one of the environment and the working action based on the output of the sensor.

8. The wearable user interface control system according to claim 1, wherein, when a camera is worn by the user, the processor detects at least one of the environment and the working action based on an image taken by the camera.

9. An information processing system, comprising:
   the wearable user interface control system according to claim 1; and
   wherein the processor is further configured to carry out a preset computation process in accordance with the accepted input operation.

10. A wearable user interface control program comprising instructions, which, when executed by a processor, cause the processor to perform operations comprising:
    selecting an action of a user to be accepted as an input operation from among preset multiple kinds of action of the user based on at least one of an environment in which the user is placed and a working action of the user; and
    accepting an output of a sensor worn by the user and detecting a movement of at least one region of the user, and when detecting based on the output of the sensor that the user has performed the selected action, accepts the action as an input operation performed by the user, wherein
    the output of the sensor is a value corresponding to the movement of the at least one region of the user, and
    the operations further comprise
       calculating a feature amount by substituting the value into a preset numerical expression, and
       determining whether the calculated feature amount is included in a range of a feature amount of each of the preset multiple kinds of action.

11. The wearable user interface control system according to claim 1, wherein the value corresponding to the movement of the at least one region of the user is at least one of a movement direction, a movement speed, a movement amount, a rotation direction, a rotation speed, or a rotation amount.

12. The wearable user interface control system according to claim 1, wherein the preset multiple kinds of action include at least one of a nodding action, an action of looking up, an action of looking down, an action of turning a head left or right, or an action of shaking a head left and right.

* * * * *